(12) United States Patent
Liao et al.

(10) Patent No.: US 8,856,219 B2
(45) Date of Patent: Oct. 7, 2014

(54) SYSTEM FOR PROVIDING A BIDIRECTIONAL DATA ACCESS SERVICE AND METHOD THEREOF

(75) Inventors: Chien-Kai Liao, Taipei (TW); Yu-Hua Li, Chiayi (TW); Kuang-Fu Lai, Taichung (TW); Tung-Hsuan Lu, Taipei (TW)

(73) Assignee: Synology Incorporated, Taipei (TW)

( * ) Notice: Subject to any disclaimer, the term of this patent is extended or adjusted under 35 U.S.C. 154(b) by 273 days.

(21) Appl. No.: 13/431,940

(22) Filed: Mar. 27, 2012

(65) Prior Publication Data

US 2013/0179492 A1    Jul. 11, 2013

(30) Foreign Application Priority Data

Jan. 10, 2012  (TW) .............................. 101100950 A

(51) Int. Cl.
  *G06F 15/16*  (2006.01)
(52) U.S. Cl.
  USPC ............ 709/203; 709/204; 709/205; 709/206
(58) Field of Classification Search
  CPC ....................................................... H04L 67/12
  USPC .................................. 709/203, 204, 205, 206
  See application file for complete search history.

(56) References Cited

U.S. PATENT DOCUMENTS

| | | | | |
|---|---|---|---|---|
| 8,077,632 | B2* | 12/2011 | Samuels et al. | 370/254 |
| 2004/0107272 | A1* | 6/2004 | Manukyan | 709/221 |
| 2005/0021603 | A1* | 1/2005 | Yokomitsu et al. | 709/203 |
| 2008/0275945 | A1* | 11/2008 | Tanimoto | 709/203 |
| 2010/0262650 | A1* | 10/2010 | Chauhan et al. | 709/203 |
| 2012/0084442 | A1* | 4/2012 | Terao | 709/224 |
| 2012/0191867 | A1* | 7/2012 | Tsunogai | 709/228 |

FOREIGN PATENT DOCUMENTS

| | | |
|---|---|---|
| EP | 1 337 076 A1 | 8/2003 |
| WO | 2005043848 A1 | 5/2005 |

\* cited by examiner

*Primary Examiner* — Noel Beharry
*Assistant Examiner* — Abdelnabi Musa
(74) *Attorney, Agent, or Firm* — Winston Hsu; Scott Margo

(57) ABSTRACT

A system for providing a bidirectional data access service includes a relay server and a service server. The relay server is located in the Internet. The service server registers an internal Internet Protocol (IP) address, an external IP address, and a corresponding server identification in the relay server, and establishes a data channel. When a user wants to utilize a predetermined service provided by the service server through a client device, the client device transmits the corresponding server identification to the relay server, and the relay server transmits the internal IP address and the external IP address to the client device according to the corresponding server identification. The client device automatically determines a connection method between the client device and the service server according to an application program, the internal IP address, the external IP address, and a network on which the client device is located.

4 Claims, 4 Drawing Sheets

SYSTEM FOR PROVIDING A BIDIRECTIONAL DATA ACCESS SERVICE AND METHOD THEREOF

BACKGROUND OF THE INVENTION

1. Field of the Invention

The present invention relates to a system for providing a bidirectional data access service and a method thereof, and particularly to a system for providing a bidirectional data access service and a method thereof that can let a client device automatically determine a connection method between the client device and a service server according to an application program of the client device, and an internal Internet Protocol address and an external Internet Protocol address of the service server.

2. Description of the Prior Art

In the prior art, when a user installs a service server on a local area network (LAN), normal installation steps are as follows:

First, the user installs a router and connects the router to the Internet (WAN); second, the user establishes the local area network (LAN) based on the router; third, the user installs a service server on the local area network (LAN) and gives the service server an internal Internet Protocol (IP) address.

When another user located on the Internet (WAN) wants to utilize a predetermined service of the service server through a client device, the user needs to set Port Forwarding in the router and set a port number of the service server corresponding to the predetermined service in the router. Meanwhile, a predetermined port number of the router can connect to the port number of the service server corresponding to the predetermined service. Thus, another user can utilize the predetermined service of the service server through the client device according to an external IP address of the router on the Internet (WAN) and the port number.

However, setting the Port Forwarding in the router requires professional network knowledge, and when the service server is located on the local area network (LAN), the client device on the Internet (WAN) needs to know the external IP address of the router on the Internet (WAN) and the predetermined port number of the router, then the client device can connect to the service server to utilize the predetermined service of the service server. Therefore, the above setting manner of the prior art is not very convenient for the user.

SUMMARY OF THE INVENTION

An embodiment provides a system for providing a bidirectional data access service. The system includes a relay server and a service server. The relay server is located on the Internet. The service server is used for registering an internal Internet Protocol (IP) address, an external IP address, and a corresponding server identification in the relay server, and establishing a data channel between the relay server and the service server. A client device transmits the corresponding server identification to the relay server and the relay server transmits the internal IP address and the external IP address to the client device according to the corresponding server identification when a user wants to utilize a predetermined service provided by the service server through the client device. The client device automatically determines a connection method between the client device and the service server according to an application program, the internal IP address, the external IP address, and a network on which the client device is located.

Another embodiment provides a method for providing a bidirectional data access service. The method includes a service server registering an internal IP address, an external IP address, and a corresponding server identification in a relay server; a client device transmitting the corresponding server identification to the relay server and the relay server transmitting the internal IP address and the external IP address to the client device according to the corresponding server identification when a user wants to utilize a predetermined service provided by the service server through the client device; and the client device automatically determining a connection method between the client device and the service server according to an application program, the internal IP address, the external IP address, and a network on which the client device is located.

The present invention provides a system for providing a bidirectional data access service and a method thereof. The system and the method utilize a service server to register an internal IP address, an external IP address, and a corresponding server identification in a relay server, and to establish a data channel between the relay server and the service server. Then, a client device can automatically determine a connection method between the client device and the service server according to an application program of the client device, the internal IP address and the external IP address of the service server, and a network on which the client device is located. Therefore, compared to the prior art, when a user wants to utilize a predetermined service provided by the service server through the client device, not only does the user not need professional network knowledge, but a quick and convenient connection method between the client device and the service server can be provided.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
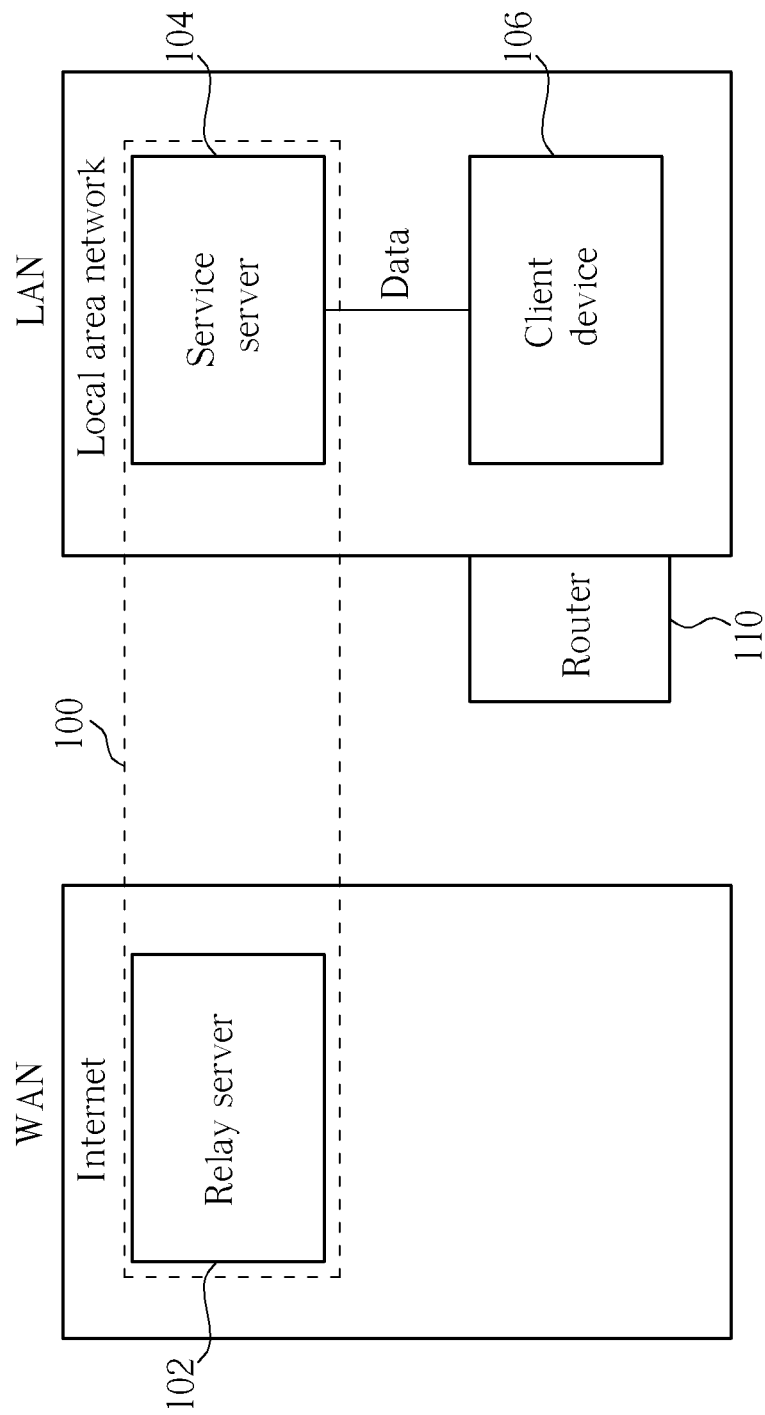
FIG. 1 is a diagram illustrating a system for providing a bidirectional data access service according to an embodiment.

Please refer to FIG. 1. FIG. 1 is a diagram illustrating a system 100 for providing a bidirectional data access service according to an embodiment. As shown in FIG. 1, the system 100 includes a relay server 102 and a service server 104. The relay server 102 is located on the Internet WAN. The service server 104 is used for registering an internal Internet Protocol (IP) address, an external IP address and a corresponding server identification in the relay server 102, and establishing a data channel 105 between the relay server 102 and the service server 104. The client device 106 can actively transmit the corresponding server identification (corresponding to the service server 104) to the relay server 102 when a user wants to utilize a predetermined service (such as a statistical operation or mathematics) provided by the service server 104 through a client device 106. Then, the relay server 102 can transmit the internal IP address and the external IP address of the service server 104 to the client device 106 according to the corresponding server identification. Therefore, the client device 106 can automatically utilize the internal IP address and the external IP address of the service server 104 in turn to determine a connection method between the client device 106 and the service server 104 according to an application program stored in the client device 106, the internal IP address and the external IP address of the service server 104, and a network on which the client device is located.

As shown in FIG. 1, when the network on which the client device 106 is located is the same as a local area network on which the service server 104 is located (such as the client device 106 and the service server 104 are both located on a local area network LAN), the client device 106 directly connects to the service server 104 through the internal IP address of the service server 104, and transfers data to the service server 104 to utilize the predetermined service of the service server 104. Then, the service server 104 returns data generated according to the predetermined service of the service server 104 to the client device 106 through the local area network on which the service server 104 is located.

Figure 2:
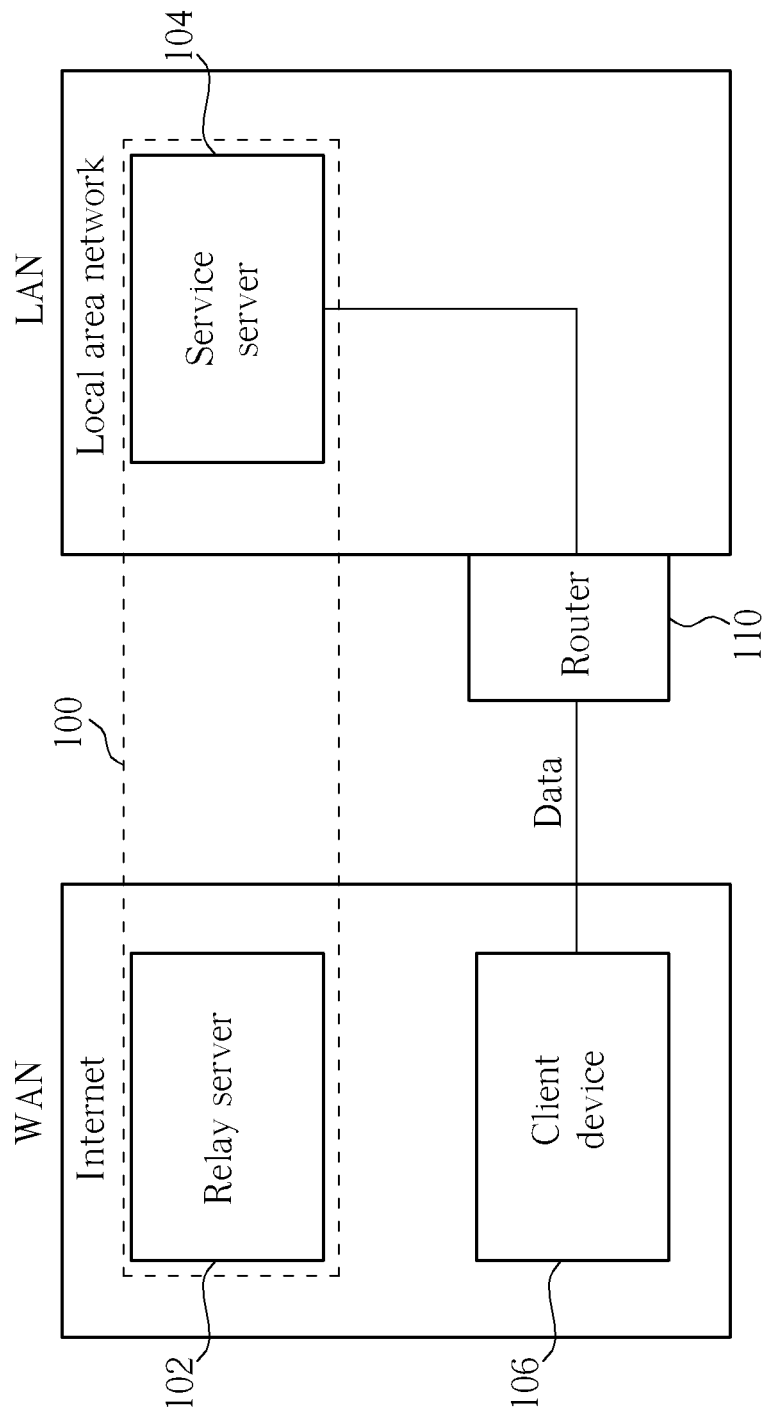
FIG. 2 and FIG. 3 are diagrams illustrating the client device being located on the Internet and the service server being located on the local area network.
Figure 3:
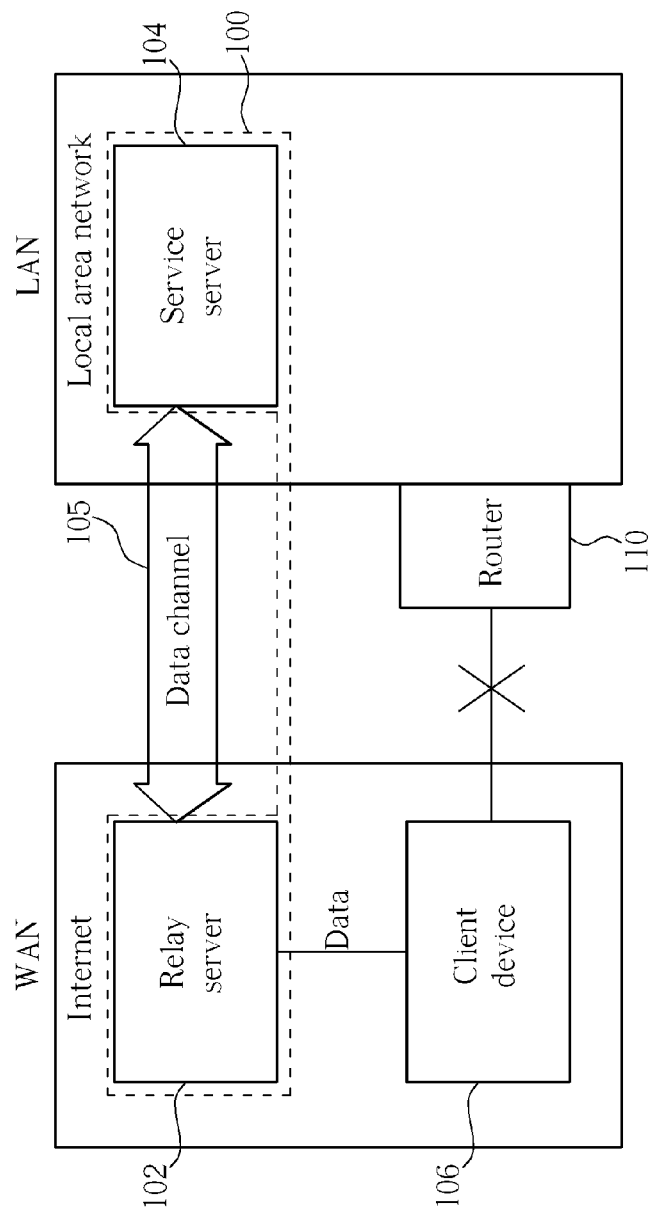

Please refer to FIG. 2 and FIG. 3. FIG. 2 and FIG. 3 are diagrams illustrating the client device 106 being located on the Internet WAN and the service server 104 being located on the local area network LAN. As shown in FIG. 2, the relay server 102 transmits the internal IP address and the external IP address of the service server 104 to the client device 106 according to the corresponding server identification. Therefore, the client device 106 can automatically utilize the internal IP address and the external IP address of the service server 104 in turn to determine a connection method between the client device 106 and the service server 104 according to the application program stored in the client device 106, the internal IP address and the external IP address of the service server 104, and a network on which the client device 106 is located. Because the client device 106 is located on the Internet WAN and the service server 104 is located on the local area network LAN, the client device 106 can not directly connect to the service server 104 through the internal IP address of the service server 104. Then, the client device 106 can automatically attempt to connect to the service server 104 through a router 110 of the local area network LAN and the external IP address of the service server 104 according to the application program of the client device 106. If the client device 106 can connect to the service server 104 through the router 110 of the local area network LAN and the external IP address of the service server 104, the client device 106 can transfer data to the service server 104 to utilize the predetermined service of the service server 104 through the router 110 of the local area network LAN and the external IP address of the service server 104. Then, the service server 104 can return data generated according to the predetermined service of the service server 104 to the client device 106 through the router 110 of the local area network LAN.

As shown in FIG. 3, the relay server 102 transmits the internal IP address and the external IP address of the service server 104 to the client device 106 according to the corresponding server identification. Therefore, the client device 106 can automatically utilize the internal IP address and the external IP address of the service server 104 in turn to determine a connection method between the client device 106 and the service server 104 according to the application program stored in the client device 106, the internal IP address and the external IP address of the service server 104 and a network on which the client device 106 is located. Because the client device 106 is located on the Internet WAN and the service server 104 is located on the local area network LAN, the client device 106 can not directly connect to the service server 104 through the internal IP address of the service server 104. Then, the client device 106 can automatically attempt to connect to the service server 104 through the router 110 of the local area network LAN and the external IP address of the service server 104 according to the application program of the client device 106. If the client device 106 can also not connect to the service server 104 through the router 110 of the local area network LAN and the external IP address of the service server 104, the relay server 102 notifies the service server 104 to establish the data channel 105 according to the corresponding server identification. Therefore, the client device 106 can connect to the service server 104 through the data channel 105 and the relay server 102. After client device 106 connects to the service server 104 through the data channel 105 and the relay server 102, the client device 106 can transfer data to the service server 104 to utilize the predetermined service of the service server 104 through the relay server 102 and the data channel 105. Then, the service server 104 also returns data generated according to the predetermined service of the service server 104 to the client device 106 through the data channel 105 and the relay server 102.

In addition, the present invention is not limited to the service server 104 being located on the local area network LAN. That is to say, the service server 104 may also be located on the Internet WAN.

Figure 4:
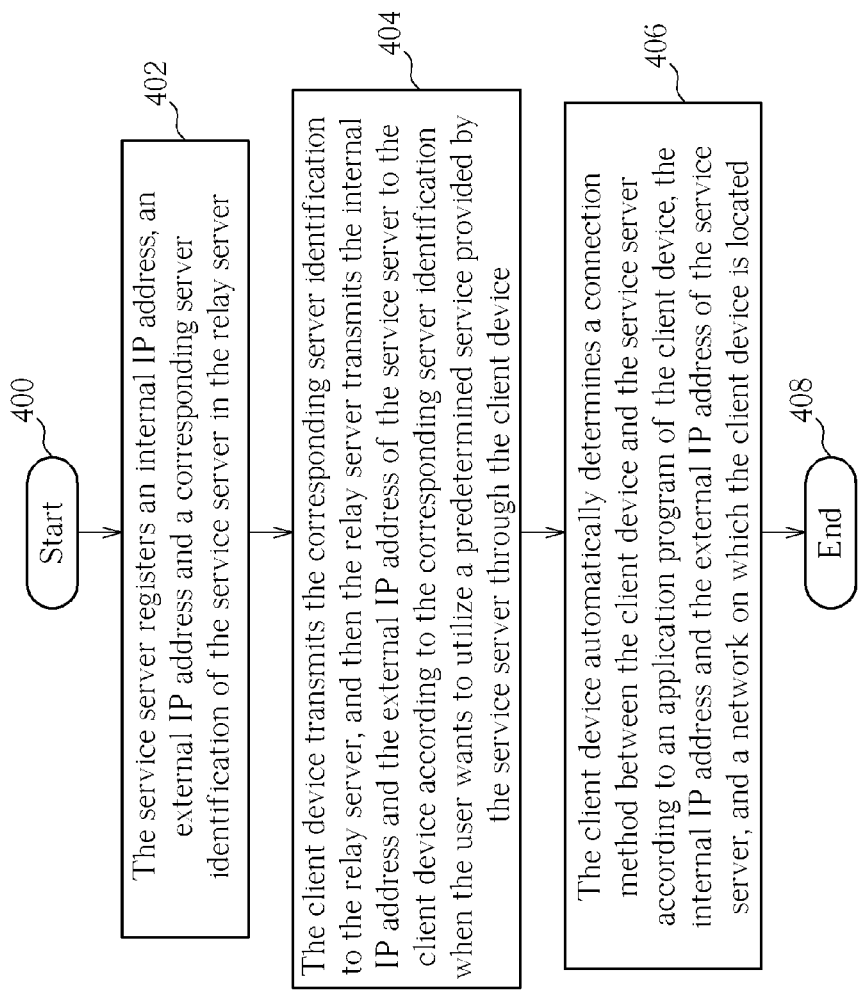
FIG. 4 is a flowchart illustrating a method for providing a bidirectional data access service according to another embodiment.

Please refer to FIG. 4, FIG. 1, FIG. 2, and FIG. 3. FIG. 4 is a flowchart illustrating a method for providing a bidirectional data access service according to another embodiment. The method in FIG. 4 is illustrated using the system 100 in FIG. 1. Detailed steps are as follows:

Step 400: Start.

Step 402: The service server 104 registers an internal IP address, an external IP address and a corresponding server identification of the service server 104 in the relay server 102.

Step 404: The client device 106 transmits the corresponding server identification to the relay server 102, and then the relay server 102 transmits the internal IP address and the external IP address of the service server 104 to the client device 106 according to the corresponding server identification when the user wants to utilize a predetermined service provided by the service server 104 through the client device 106.

Step 406: The client device 106 automatically determines a connection method between the client device 106 and the service server 104 according to an application program of the client device 106, the internal IP address and the external IP address of the service server 104, and a network on which the client device 106 is located.

Step 408: End.

In Step 404, when the user wants to utilize the predetermined service provided by the service server 104 (such as a statistical operation or mathematics) through the client device 106, the client device 106 can actively transmit the corresponding server identification (corresponding to the service server 104) to the relay server 102. Then, the relay server 102 transmits the internal IP address and the external IP address of the service server 104 to the client device 106 according to the corresponding server identification.

In Step 406 (taking FIG. 1 as an example), because the relay server 102 transmits the internal IP address and the external IP address of the service server 104 to the client device 106 according to the corresponding server identification, the client device 106 can automatically utilize the internal IP address and the external IP address of the service server 104 in turn to determine the connection method between the client device 106 and the service server 104 according to the application program of the client device 106, the internal IP address and the external IP address of the service server 104, and the network on which the client device is located. When the network on which the client device is located is the same as a local area network on which the service server 104 is located (such as the client device 106 and the service server 104 are both located on a local area network LAN), the client device 106 directly connects to the service server 104 through the internal IP address of the service server 104, and transfers data to the service server 104 to utilize the predetermined service of the service server 104. Then, the service server 104 returns data generated according to the predetermined service of the service server 104 to the client device 106 through the local area network on which the service server 104 is located.

In Step 406 (taking FIG. 2 as an example), because the client device 106 is located on the Internet WAN and the service server 104 is located on the local area network LAN, the client device 106 can not directly connect to the service server 104 through the internal IP address of the service server 104. Then, the client device 106 can automatically attempt to connect to the service server 104 through the router 110 of the local area network LAN and the external IP address of the service server 104 according to the application program of the client device 106. If the client device 106 can connect to the service server 104 through the router 110 of the local area network LAN and the external IP address of the service server 104, the client device 106 can transfer data to the service server 104 to utilize the predetermined service of the service server 104 through the router 110 of the local area network LAN and the external IP address of the service server 104. Then, the service server 104 returns data generated according to the predetermined service of the service server 104 to the client device 106 through the router 110 of the local area network LAN.

In Step 406 (taking FIG. 3 as an example), because the client device 106 is located on the Internet WAN and the service server 104 is located on the local area network LAN, the client device 106 can not directly connect to the service server 104 through the internal IP address of the service server 104. Then, the client device 106 can automatically attempt to connect to the service server 104 through the router 110 of the local area network LAN and the external IP address of the service server 104 according to the application program of the client device 106. If the client device 106 can also not connect to the service server 104 through the router 110 of the local area network LAN and the external IP address of the service server 104, the relay server 102 notifies the service server 104 to establish the data channel 105 according to the corresponding server identification. Therefore, the client device 106 can connect to the service server 104 through the data channel 105 and the relay server 102. After the client device 106 connects to the service server 104 through the data channel 105 and the relay server 102, the client device 106 can transfer data to the service server 104 to utilize the predetermined service of the service server 104 through the relay server 102 and the data channel 105. Then, the service server 104 also returns data generated according to the predetermined service of the service server 104 to the client device 106 through the data channel 105 and the relay server 102.

To sum up, the system for providing a bidirectional data access service and the method thereof utilize the service server to register the internal IP address, the external IP address, and the corresponding server identification in the relay server, and to establish the data channel between the relay server and the service server. Then, the client device can automatically determine a connection method between the client device and the service server according to the application program of the client device, the internal IP address and the external IP address of the service server, and the network on which the client device is located. Therefore, compared to the prior art, when the user wants to utilize the predetermined service provided by the service server through the client device, not only does the user not need professional network knowledge, but a quick and convenient connection method between the client device and the service server can be provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for providing a bidirectional data access service, the system comprising:
   a relay server located on the Internet; and
   a service server for registering an internal Internet Protocol (IP) address, an external IP address, and a corresponding server identification in the relay server, and establishing a data channel between the relay server and the service server;
   wherein a client device transmits the corresponding server identification to the relay server and the relay server transmits the internal IP address and the external IP address to the client device according to the corresponding server identification when a user wants to utilize a predetermined service provided by the service server through the client device, wherein the client device automatically determines a connection method between the client device and the service server according to an application program, the internal IP address, the external IP address, and a network on which the client device is located by the relay server notifying the service server to establish the data channel according to the corresponding server identification and the client device utilizing the relay server to transfer data of the client device to the service server through the data channel to utilize the predetermined service when the client device is located on the Internet and the client device does not connect to the service server through a router of a local area network on which the service server is located and the external IP address, wherein the relay server and the service server do not belong to a same network.

2. The system of claim 1, wherein the service server returns data generated according to the predetermined service to the client device through the data channel.

3. A method for providing a bidirectional data access service, the method comprising:
   a service server registering an internal IP address, an external IP address, and a corresponding server identification in a relay server;
   a client device transmitting the corresponding server identification to the relay server and the relay server transmitting the internal IP address and the external IP address to the client device according to the corresponding server identification when a user wants to utilize a predetermined service provided by the service server through the client device; and
   the client device automatically determining a connection method between the client device and the service server according to an application program, the internal IP address, the external IP address, and a network on which the client device is located by the relay server notifying the service server to establish the data channel according to the corresponding server identification and the client device utilizing the relay server to transfer data of the client device to the service server through the data channel to utilize the predetermined service when the client device is located on the Internet and the client device does not connect to the service server through a router of a local area network on which the service server is located and the external IP address, wherein the relay server and the service server do not belong to a same network.

4. The method of claim 3, wherein the service server returns data generated according to the predetermined service to the client device through the data channel.

* * * * *